(12) United States Patent
Chen et al.

(10) Patent No.: US 11,129,044 B2
(45) Date of Patent: Sep. 21, 2021

(54) METHOD FOR TRANSMITTING WIRELESS NETWORK DATA, SENDING TERMINAL AND RECEIVING TERMINAL

(71) Applicant: Wangsu Science & Technology Co., Ltd., Shanghai (CN)

(72) Inventors: Xiaobin Chen, Shanghai (CN); Wensheng Chen, Shanghai (CN); Weilong Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 84 days.

(21) Appl. No.: 16/570,536

(22) Filed: Sep. 13, 2019

(65) Prior Publication Data

US 2020/0008094 A1 Jan. 2, 2020

Related U.S. Application Data (63) Continuation of application No. PCT/CN2018/081743, filed on Apr. 3, 2018.

(30) Foreign Application Priority Data

Dec. 11, 2017 (CN) .......................... 201711308781.0

(51) Int. Cl.
*H04W 28/02* (2009.01)
*H04W 28/20* (2009.01)
(Continued)

(52) U.S. Cl.
CPC ....... *H04W 28/0236* (2013.01); *H04W 28/20* (2013.01); *H04W 72/0446* (2013.01); *H04L 41/0896* (2013.01)

(58) Field of Classification Search
CPC ............. H04L 41/0896; H04L 43/0882; H04L 43/0888; H04L 47/12; H04L 47/127;
(Continued)

(56) References Cited

U.S. PATENT DOCUMENTS 6,788,704 B1 * 9/2004 Lindsay ................ H04L 1/1671
370/230
7,161,978 B2 * 1/2007 Lu ........................... H04L 49/90
375/219

(Continued)

FOREIGN PATENT DOCUMENTS

CN 101305540 A * 11/2008 ........... H04L 1/0002
CN 101695181 A 4/2010
(Continued)

OTHER PUBLICATIONS

European Communication pursuant to Rules 70(2) and 70a(2) EPC dated Mar. 20, 2020, Patent Application No. 18888133.8-1213, filed Apr. 3, 2018, 1 page.
(Continued)

*Primary Examiner* — Eric Nowlin
(74) *Attorney, Agent, or Firm* — Davis Wright Tremaine LLP (57) ABSTRACT

The present application discloses a method for transmitting wireless network data, a sending terminal and a receiving terminal, wherein the method includes: sending data messages to a receiving terminal based on an initial window value and an initial aggregation depth; receiving response messages fed back by the receiving terminal, and determining a current maximum bandwidth and a current window value based on representation information of the response messages; calculating a current maximum aggregation depth according to the current maximum bandwidth; and sending data messages to the receiving terminal according to the current window value and the current maximum aggregation
(Continued)

depth, and providing the current maximum aggregation depth to the receiving terminal, so that the receiving terminal feeds back the response messages according to the current maximum aggregation depth. The technical solution provided by the present application can improve the data transmission efficiency.

19 Claims, 5 Drawing Sheets

(51) Int. Cl.
*H04W 72/04* (2009.01)
*H04L 12/24* (2006.01)

(58) Field of Classification Search
CPC . H04W 24/02; H04W 28/0236; H04W 28/20; H04W 72/04; H04W 72/0446
See application file for complete search history.

(56) References Cited

U.S. PATENT DOCUMENTS

| | | | | |
|---|---|---|---|---|
| 7,283,474 B1* | 10/2007 | Bergenwall | ............. | H04L 69/04 370/235 |
| 7,502,318 B2* | 3/2009 | Lindsay | ............... | H04L 1/1671 370/230 |
| 7,583,594 B2* | 9/2009 | Zakrzewski | ............ | H04L 47/10 370/229 |
| 7,920,470 B2* | 4/2011 | Lindsay | .................. | H04L 47/27 370/230 |
| 7,948,911 B2* | 5/2011 | Larsson | ............... | H04W 28/22 370/252 |
| 8,311,019 B2* | 11/2012 | Mori | ................. | H04W 56/0045 370/336 |
| 8,761,010 B2* | 6/2014 | Jinzaki | .................... | H04L 47/20 370/230 |
| 8,867,467 B2* | 10/2014 | Liu | ..................... | H04W 28/065 370/329 |
| 9,077,625 B2* | 7/2015 | Yoshida | ............. | H04L 43/0817 |
| 9,231,829 B2* | 1/2016 | Isobe | .................. | H04L 47/193 |
| 9,525,520 B2* | 12/2016 | Asterjadhi | ............ | H04W 28/04 |
| 9,749,091 B2* | 8/2017 | Viger | .................... | H04L 1/1621 |
| 9,872,298 B2* | 1/2018 | Verma | ............... | H04W 52/0216 |
| 10,263,894 B2* | 4/2019 | Lopez Serrano | ..... | H04L 47/193 |
| 10,594,568 B2* | 3/2020 | Zhang | ............... | H04L 41/142 |
| 2002/0015385 A1* | 2/2002 | Yi | ........................ | H04L 1/1685 370/236 |
| 2003/0081664 A1* | 5/2003 | Lu | ........................... | H04L 49/90 375/222 |
| 2003/0217318 A1* | 11/2003 | Choi | ..................... | H04W 24/00 714/750 |
| 2004/0047331 A1* | 3/2004 | Jang | ...................... | H04L 1/1835 370/346 |
| 2004/0151113 A1* | 8/2004 | Zakrzewski | .......... | H04L 47/283 370/230 |
| 2004/0235447 A1* | 11/2004 | Gronberg | .............. | H04L 1/1614 455/403 |
| 2005/0207436 A1 | 9/2005 | Varma | | |
| 2006/0034176 A1* | 2/2006 | Lindsay | .................. | H04L 47/27 370/236 |
| 2006/0262738 A1 | 11/2006 | Fernandes et al. | | |
| 2008/0043712 A1* | 2/2008 | Hart | .................... | H04L 27/2655 370/348 |
| 2008/0298306 A1* | 12/2008 | Larsson | ................ | H04L 1/0032 370/328 |
| 2009/0138639 A1* | 5/2009 | Lindsay | ................ | H04L 47/193 710/106 |
| 2011/0002310 A1* | 1/2011 | Mori | ................. | H04W 56/0045 370/336 |
| 2011/0179183 A1* | 7/2011 | Lindsay | ................ | H04L 1/1671 709/227 |
| 2012/0201151 A1* | 8/2012 | Kubota | ................. | H04L 1/1851 370/252 |
| 2013/0176848 A1* | 7/2013 | Jinzaki | .................... | H04L 47/20 370/230.1 |
| 2013/0315071 A1* | 11/2013 | Yoshida | .................. | H04L 43/10 370/241.1 |
| 2014/0254408 A1* | 9/2014 | Shukla | .................. | H04L 1/1614 370/252 |
| 2014/0355442 A1* | 12/2014 | Isobe | .................. | H04L 41/0896 370/235 |
| 2015/0146648 A1* | 5/2015 | Viger | ..................... | H04L 1/1685 370/329 |
| 2016/0309480 A1* | 10/2016 | Verma | ............... | H04W 52/0216 |
| 2017/0310601 A1* | 10/2017 | Yu | ........................ | H04L 43/0817 |
| 2017/0366435 A1* | 12/2017 | Oshiba | .................... | H04L 43/16 |
| 2018/0176136 A1* | 6/2018 | Yang | ................... | H04L 47/193 |
| 2019/0173763 A1* | 6/2019 | Zhang | .................. | H04L 41/147 |
| 2020/0389381 A1* | 12/2020 | Oshiba | ................ | H04L 43/0882 |

FOREIGN PATENT DOCUMENTS

| | | | | | |
|---|---|---|---|---|---|
| CN | 101682898 B | * | 12/2012 | ........ | H04W 56/0045 |
| CN | 104022843 A | | 9/2014 | | |
| CN | 105813142 A | | 7/2016 | | |
| CN | 106131043 A | | 11/2016 | | |
| CN | 108011780 A | * | 5/2018 | ........... | H04L 41/142 |
| CN | 108011780 B | * | 1/2019 | ............ | H04W 24/08 |
| CN | 109905327 A | * | 6/2019 | ............ | H04W 28/10 |
| CN | 109905327 B | * | 5/2021 | ............ | H04L 47/266 |
| EP | 1890447 A2 | * | 2/2008 | ......... | H04L 27/2655 |
| EP | 1946472 A1 | * | 7/2008 | ........... | H04L 1/0032 |
| EP | 2136587 A2 | * | 12/2009 | ......... | H04L 27/2655 |
| EP | 2164272 A1 | * | 3/2010 | ........ | H04W 56/0045 |
| EP | 1946472 A4 | * | 6/2011 | ........... | H04L 1/0015 |
| EP | 2136587 A3 | * | 5/2012 | ......... | H04L 27/2692 |
| EP | 2164272 A4 | * | 4/2014 | ........ | H04W 56/0045 |
| EP | 1946472 B1 | * | 3/2017 | ........... | H04L 1/0032 |
| EP | 3579615 A1 | * | 12/2019 | ........ | H04W 28/0236 |
| EP | 3579615 A4 | * | 4/2020 | ........ | H04W 28/0236 |
| JP | 4985218 B2 | * | 7/2012 | ............. | H04W 28/16 |
| KR | 100937569 B1 | * | 1/2010 | ......... | H04L 27/2655 |
| KR | 100988663 B1 | * | 10/2010 | ......... | H04B 7/15507 |
| WO | WO-2007053072 A1 | * | 5/2007 | ............ | H04L 1/0032 |
| WO | 2016186396 A1 | | 11/2016 | | |
| WO | WO-2019114156 A1 | * | 6/2019 | ............ | H04W 28/10 |

OTHER PUBLICATIONS

Extended European Search Report dated Mar. 3, 2020, Patent Application No. 18888133.8-1213, filed Apr. 3, 2018, 9 pages.
International Search Report dated Jun. 20, 2019, in International Patent Application No. PCT/CN2018/081743, filed on Apr. 3, 2018, 5 pages with translation.
Chinese First Office Action dated Aug. 5, 2020, Patent Application No. 201711308781.0, 6 pages.

* cited by examiner

METHOD FOR TRANSMITTING WIRELESS NETWORK DATA, SENDING TERMINAL AND RECEIVING TERMINAL

CROSS-REFERENCE TO RELATED APPLICATIONS

The present application is a continuation of international application No. PCT/CN2018/081743 filed Apr. 3, 2018, which claims benefit of Chinese Application No. 201711308781.0 filed Dec. 11, 2017, the contents of which are incorporated herein by reference in their entirety.

TECHNICAL FIELD

The present application relates to the field of Internet technologies, and more particularly, to a method for transmitting wireless network data, a sending terminal and a receiving terminal.

BACKGROUND

With the continuous development of Internet technologies, a wireless network has become one of the main carriers for network traffic at present. In the wireless network, a Wi-Fi network is a major way for accessing a wireless terminal currently.

While data is sent in the Wi-Fi network, a sender will generally determine the number of messages that could be sent according to a current window value. However, the window value is usually determined by response messages fed back by a receiver. Therefore, in the current Wi-Fi network, the response messages usually determine the number of messages that could be sent by the sender.

At present, when the sender sends data messages to the receiver, the receiver may feed back corresponding response messages with respect to the data messages received. In this way, the sender may update the current window value according to the response messages received, and send the data messages according to the updated window value.

Since the response messages fed back by the receiver at current are usually one-to-one corresponding to the data messages sent by the sender, the sender would frequently update the window value, so that the sender consumes more resources in updating the window value. In addition, as there are a large number of response messages, more response messages may also be lost when the wireless network fluctuates. In this way, the sender may be unable to receive parts of the response messages, so that the window value cannot be updated in time. However, the window value would limit the number of data messages to be sent; thus, the sender cannot effectively utilize the wireless network bandwidth, resulting in lower efficiency in data transmission.

SUMMARY

The present application is intended to provide a method for transmitting wireless network data, a sending terminal and a receiving terminal, which can improve the data transmission efficiency.

In order to achieve the object above, an aspect of the present application provides a method for transmitting wireless network data, wherein the method includes: sending data messages to a receiving terminal based on an initial window value and an initial aggregation depth; receiving response messages fed back by the receiving terminal, and determining a current maximum bandwidth and a current window value based on representation information of the response messages; calculating a current maximum aggregation depth according to the current maximum bandwidth; and sending data messages to the receiving terminal according to the current window value and the current maximum aggregation depth, and providing the current maximum aggregation depth to the receiving terminal, so that the receiving terminal feeds back the response messages according to the current maximum aggregation depth.

In order to achieve the object above, another aspect of the present application further provides a sending terminal, wherein the sending terminal includes a processor and a memory storing a computer program therein, while being executed by the processor, the computer program implements the following steps: sending data messages to a receiving terminal based on an initial window value and an initial aggregation depth; receiving response messages fed back by the receiving terminal, and determining a current maximum bandwidth and a current window value based on representation information of the response messages; calculating a current maximum aggregation depth according to the current maximum bandwidth; and sending data messages to the receiving terminal according to the current window value and the current maximum aggregation depth, and providing the current maximum aggregation depth to the receiving terminal, so that the receiving terminal feeds back the response messages according to the current maximum aggregation depth.

In order to achieve the object above, another aspect of the present application further provides a method for transmitting wireless network data, wherein the method includes: receiving data messages and a maximum aggregation depth sent by a sending terminal; counting the number of data messages received in a specified time slot, and comparing the number of data messages with the maximum aggregation depth; and feeding back response messages to the sending terminal according to the comparison result.

In order to achieve the object above, another aspect of the present application further provides a receiving terminal, comprising a processor and a memory storing a computer program therein, while being executed by the processor, the computer program implements the following steps: receiving data messages and a maximum aggregation depth sent by a sending terminal; counting the number of data messages received in a specified time slot, and comparing the number of data messages with the maximum aggregation depth; and feeding back response messages to the sending terminal according to a comparison result.

As can be seen above, in the technical solutions provided by the present application, when sending the data messages, the sending terminal may provide the receiving terminal with the maximum aggregation depth as well, and the maximum aggregation depth may be used as a basis for the receiving terminal to feed back the response messages. Specifically, the receiving terminal may reply one response message to the sending terminal whenever the number of the data messages received by the receiving terminal reaches the maximum aggregation depth. When receiving the response messages, the sending terminal may dynamically adjust the current maximum bandwidth and the current window value based on the number information carried in the response messages. The current maximum aggregation depth may be further adjusted according to the adjusted maximum bandwidth. Then, the data messages may be sent to the receiving terminal again according to the adjusted window value and the maximum aggregation depth, and the adjusted maximum aggregation depth may be provided to the receiving terminal as well. In this way, the receiving terminal may accordingly feed back the response messages according to the current maximum aggregation depth. Thus, in the present application, the receiving terminal may uniformly reply one response message when the data messages received reach the maximum aggregation depth. In this way, the receiving terminal does not need to feed back the response message for each data message, which greatly reduces the number of response messages to be sent. Thus, the sending terminal may reduce the time for processing the response messages; in addition, since the number of response messages is reduced, the probability of losing the response messages due to network fluctuation may also be reduced; and the sending terminal may adjust the window value in time, thus improving the data transmission efficiency.

BRIEF DESCRIPTION OF THE DRAWINGS

In order to describe the technical solutions in the embodiments of the present application more clearly, the drawings used in the description of the embodiments will be briefly described below. Obviously, the in the following description are merely for describing some embodiments of the present application. For those of ordinary skills in the art, other drawings may also be obtained based on these drawings without any creative work.

DETAILED DESCRIPTION

To make the objects, technical solutions, and advantages of the present application clearer, the following further describes the embodiments of the present application in detail with reference to the drawings.

First Embodiment

Figure 1:
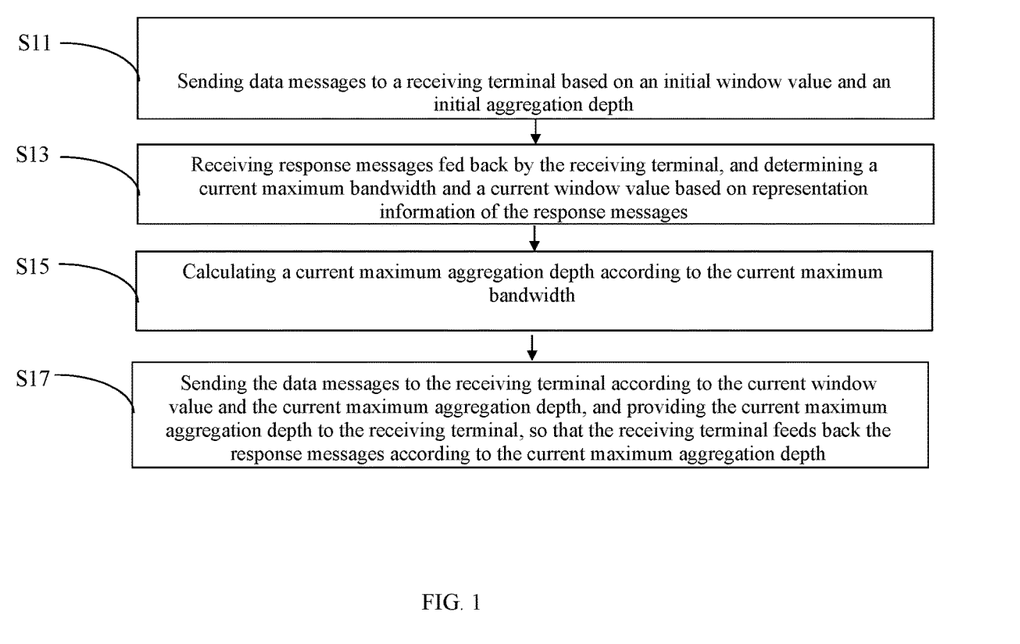
FIG. 1 is a flow chart showing a method for transmitting wireless network data in a first embodiment of the present application.
Figure 2:
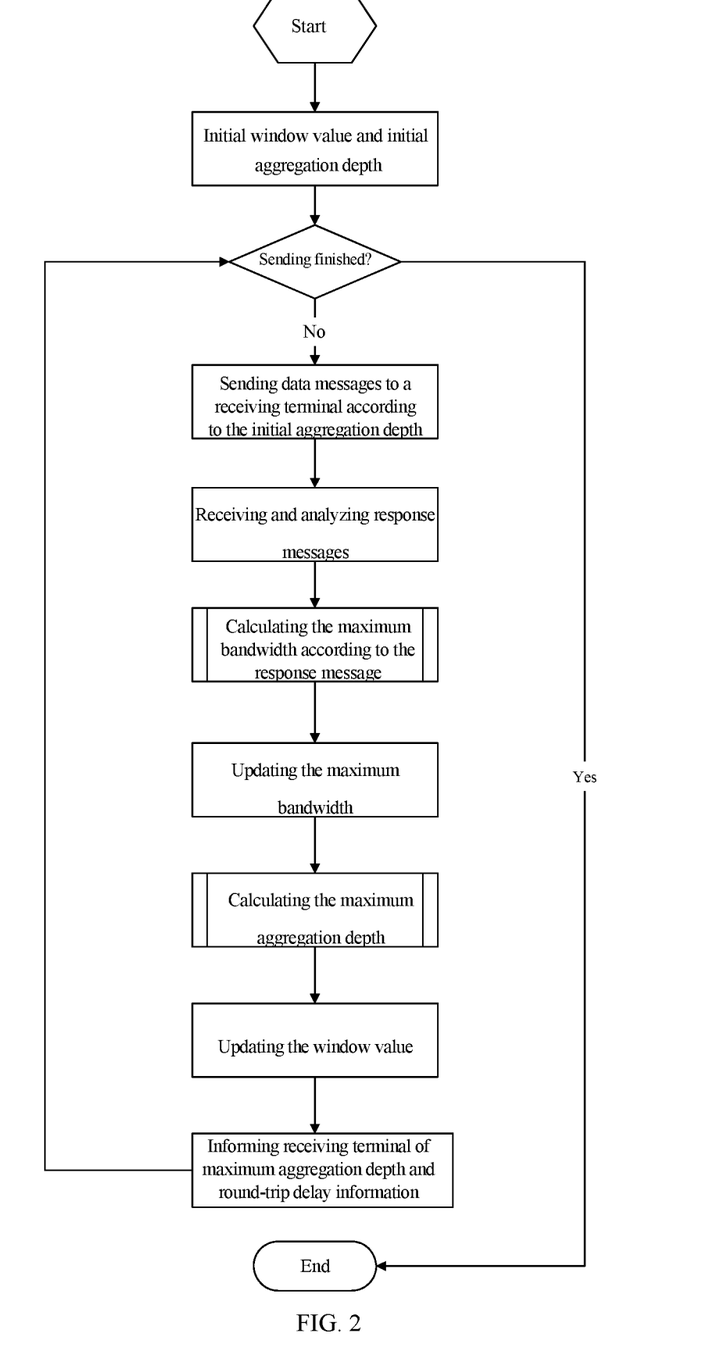
FIG. 2 is a schematic diagram showing the method for transmitting wireless network data in the first embodiment of the present application.

The present application provides a method for transmitting wireless network data. The method may be applied to a sending terminal, and the sending terminal may be a terminal device supporting a wireless network. For example, the sending terminal may be a router. Of course, the sending terminal may also be an electronic device used by a user. For example, the sending terminal may be a desktop computer, a laptop, a tablet computer, a smart phone, or a smart wearable device supporting wireless network. With reference to FIG. 1 and FIG. 2, the method may include the following steps.

In S11, data messages are sent to a receiving terminal based on an initial window value and an initial aggregation depth.

In the embodiment, when starting to send the data messages to the receiving terminal, a sending terminal may send the data messages based on the initial window value and the initial aggregation depth. The initial window value and the initial aggregation depth may be preset with respect to a network status. For example, in a wireless network with a bandwidth of 5 Mbps, the initial window value and the initial aggregation depth may be 24 and 6 respectively. However, in a wireless network with a higher bandwidth of 100 Mbps, the initial window value and the initial aggregation depth may be 32 and 8 respectively.

In the embodiment, the aggregation depth may define the number of data messages sent each time, while the window value may define a total number of data messages sent continuously. For example, when the initial window value and the initial aggregation depth are 24 and 6 respectively, the sending terminal may send 6 data messages each time, and stop sending the data messages after continuously sending 24 data messages, i.e., after the windows are used up. Specifically, the sending terminal may send the data messages to the receiving terminal according to a specified time period. For example, the specified time period may be 1 ms; in this way, the sending terminal may send the data messages to the receiving terminal every 1 ms. In each time period, the number of data messages sent by the sending terminal may be the same as the initial aggregation depth. For example, the sending terminal may send 6 data messages to the receiving terminal every 1 ms. When a total number of data messages continuously sent reaches the initial window value, and the receiving terminal does not feed back the response messages, the sending terminal may stop sending the data messages to the receiving terminal. For example, after continuously sending 24 data messages to the receiving terminal, the sending terminal may stop sending the data messages to the receiving terminal, if the sending terminal never receives the response messages sent from the receiving terminal ever. After receiving the response messages fed back by the receiving terminal, the sending terminal may send data messages of a number responded by the receiving terminal to the receiving terminal again.

In S13, response messages fed back by the receiving terminal are received, and a current maximum bandwidth and a current window value are determined based on representation information of the response messages.

In the embodiment, when the sending terminal receives the response messages fed back by the receiving terminal, the current maximum bandwidth and the current window value may be determined based on the representation information of the response messages.

In the embodiment, the response messages fed back by the receiving terminal may carry number information which is configured for representing the number of data messages received by the receiving terminal in a specified time slot. Specifically, the specified time slot may be a preset period. For example, the specified time slot may be 4 ms, and the number information may represent the number of data messages received by the receiving terminal within 4 ms. In an application scenario, the sending terminal sends 6 data messages to the receiving terminal every 1 ms, and the sending terminal may send 24 data messages within 4 ms in total, while the receiving terminal may only receive 20 data messages within the 4 ms, then the response messages fed back by the receiving terminal may carry number information representing 20.

In the embodiment, the metric for the maximum bandwidth may be different from the metric for the conventional bandwidth. For a conventional bandwidth, bps (bytes per second) may be taken as a measurement unit, while in the embodiment, when determining the current maximum bandwidth, respective response messages received by the sending terminal within a preset period may be recorded. For example, the preset period may be 1 s, then respective response messages received by the sending terminal within is may be recorded. Assuming that the sending terminal receives 5 response messages within is in total; at the moment, the numbers represented by the number information in respective response messages may be counted. For example, in the 5 response messages above, the numbers represented by the number information are 20, 22, 24, 24 and 22 respectively. At the moment, the counted numbers may be added to obtain a sum of the counted numbers. For example, in the example above, the sum of the counted numbers may be 112 (20+22+24+24+22). In this way, a ratio of the sum of the counted numbers to the preset period may be taken as the current maximum bandwidth. In the example above, 112 may be used as the current maximum bandwidth. In the embodiment, a unit of the maximum bandwidth may be pps (packets per second).

In the embodiment, when determining the current window value, the current window value may be obtained through accumulation on the initial window value. Specifically, after receiving a response message fed back by the receiving terminal, the sending terminal may record the number represented by the number information in the response message, and then a sum of the initial window value and the recorded number may be taken as the current window value. For example, the initial window value is 24, and the number represented by the number information in the received response message is 6, then 30 may be taken as the current window value. In this way, an upper limiting number of data messages continuously sent may be changed from 24 to 30 when sending the data messages next time. Subsequently, after the sending terminal receives the response message fed back by the receiving terminal again, the number may be accumulated on the basis of 30, so as to obtain a larger window value. In an actual application scenario, in order to prevent the window value from increasing indefinitely, an upper limit for increment may be set for the window value. Specifically, if the current maximum bandwidth is not increased within the specified duration, it indicates that the current network status is relatively stable, and the current window value may be maintained unchanged, instead of being continuously increased. For example, the current maximum bandwidth is 1000 pps within 5 s, then the current window value may be maintained unchanged at the end of the 5th second. The window value may be maintained until the current maximum bandwidth exceeds 1000 pps. If the current maximum bandwidth exceeds 1000 pps, the current window value may be continuously increased according to a normal accumulation process.

In S15, a current maximum aggregation depth is calculated according to the current maximum bandwidth.

In the embodiment, after the current maximum bandwidth is determined, the current maximum aggregation depth may be calculated based on the current maximum bandwidth. Specifically, the current maximum aggregation depth may be calculated according to a following formula:

$$agg = 1.2 \cdot (pps + 500)/1000$$

Wherein, agg represents the current maximum aggregation depth, and pps represents the current maximum bandwidth.

It shall be noted that in an actual application scenario, the maximum aggregation depth obtained according to the formula above may be relatively small sometimes. In order to maintain the maximum aggregation depth within a reasonable range, a minimum value of the maximum aggregation depth may be defined. Specifically, when the current maximum bandwidth is less than a specified threshold value, the current maximum aggregation depth may be set to be no less than a first lower limit value. When the current maximum bandwidth is greater than or equal to the specified threshold value, the current maximum aggregation depth may be set to be no less than a second lower limit value, wherein the first lower limit value is less than the second lower limit value. For example, the specified threshold value may be 1000 pps, the first lower limit value may be 2, and the second lower limit value may be 3. When the current maximum bandwidth is less than 1000 pps, the current maximum aggregation depth may be set as 2 if the current maximum aggregation depth obtained by calculation is less than 2. In addition, when the current maximum bandwidth is greater than or equal to 1000 pps, the current maximum aggregation depth may be set as 3 if the current maximum aggregation depth obtained by calculation is less than 3.

In S17, data messages are sent to the receiving terminal according to the current window value and the current maximum aggregation depth, and the current maximum aggregation depth is provided to the receiving terminal, so that the receiving terminal feeds back the response messages according to the current maximum aggregation depth.

In the embodiment, after the current window value and the current maximum aggregation depth are determined, the data messages may be sent to the receiving terminal according to the current window value and the current maximum aggregation depth. Specifically, the current maximum aggregation depth may define the number of data messages sent each time, while the current window value may define a total number of data messages sent continuously. For example, when the current window value and the current aggregation depth are 30 and 6 respectively, the sending terminal may send 6 data messages each time, and stop sending the data massages after continuously sending 30 data messages. Specifically, the sending terminal may send the data messages to the receiving terminal according to a specified time period. For example, the specified time period may be 1 ms; in this way, the sending terminal may send the data messages to the receiving terminal every 1 ms. In each time period, the number of data messages sent by the sending terminal may be the same as the current aggregation depth. For example, the sending terminal may send 6 data messages to the receiving terminal every 1 ms. When a total number of data messages continuously sent reaches the current window value, and the receiving terminal does not feed back the response messages, the sending terminal may stop sending the data messages to the receiving terminal. For example, after continuously sending 30 data messages to the receiving terminal, the sending terminal may stop sending the data messages to the receiving terminal, if the sending terminal never receives the response messages sent by the receiving terminal ever. After receiving the response messages fed back by the receiving terminal, the sending terminal may send data messages of a number responded by the receiving terminal to the receiving terminal again.

In the embodiment, when the sending terminal sends the data messages to the receiving terminal, the current maximum aggregation depth may be provided to the receiving terminal as well. In this way, after receiving the current maximum aggregation depth, the receiving terminal may feed back the response messages according to the current maximum aggregation depth. Specifically, the receiving terminal may count the number of data messages received within the specified time slot. The specified time slot may be the same as the time period during which the sending terminal sends the data messages. For example, the sending terminal sends the data messages according to the time period of 1 ms, then the receiving terminal may count the number of data messages received within the duration of 1 ms.

In the embodiment, when counting the number of the received data messages, the counted number may be compared with the current maximum aggregation depth. When the number of data messages is greater than or equal to the maximum aggregation depth, the receiving terminal may reply one response message to the sending terminal when the number of the received data messages reaches the maximum aggregation depth. For example, when 18 data messages are received within 1 ms in total and the current maximum aggregation depth is 6, the receiving terminal may reply 3 response messages, wherein each response message may be sent with respect to 6 data messages. In this way, the response messages may carry number information for representing the total number of the received data messages, thus informing the sending terminal that the current response messages are sent with respect to 6 data messages.

In addition, in the embodiment, if the number of data messages is less than the maximum aggregation depth, the receiving terminal may determine a tolerance time limit. The receiving terminal may continuously count the number of data messages received within the tolerance time limit. For example, when the number of data messages received by the receiving terminal within 1 ms is 4, which is less than the current maximum aggregation depth of 6, the receiving terminal may determine the tolerance time limit according to the current network status. Assuming that the tolerance time limit is 1 ms, the receiving terminal may continuously count the number of data messages received within the next 1 ms based on the number of 4. For example, in the next 1 ms, the receiving terminal receives 2 data messages again, then the counted number of the received data messages is 6. In actual application, when sending the data messages to the receiving terminal, the sending terminal may provide round-trip delay information to the receiving terminal. The round-trip delay information may be determined by the sending terminal based on a time point at which a data messages is sent and a time point when a data message is received. Specifically, a difference between time point when a data message is received and a time point at which a data message is sent may be used as the round-trip delay information. For example, the time n point at which a data messages is sent is 0 ms, while the time point when a data messages is received is 10 ms, then the round-trip delay information may be 10 ms. In the embodiment, after receiving the round-trip delay information, the receiving terminal may determine the tolerance time limit according to the round-trip delay information, and feed back the response messages based on the tolerance time limit and the current maximum aggregation depth. Specifically, the receiving terminal may compare a delay represented by the round-trip delay information with a first delay threshold value and a second delay threshold value respectively when determining the tolerance time limit, wherein the first delay threshold value is less than the second delay threshold value. When the delay is less than or equal to the first delay threshold value, the tolerance time limit may be set as a first preset time limit value. When the delay is greater than the first delay threshold value, and is less than or equal to the second delay threshold value, the tolerance time limit may be set as a second preset time limit value. When the delay is greater than the second delay threshold value, the tolerance time limit may be set as a third preset time limit value, wherein the first preset time limit value is less than the second preset time limit value, and the second preset time limit value is less than the third preset time limit value. For example, when the delay is less than or equal to 20 ms, the tolerance time limit may be set as 1 ms; when the delay is greater than 20 ms, and less than or equal to 50 ms, the tolerance time limit may be set as 2 ms; and when the delay is greater than 50 ms, the tolerance time limit may be set as 5 ms.

In the embodiment, when the number of data messages is continuously counted within the tolerance time limit, if the tolerance time limit does not run out and a total number of the received data messages reaches the maximum aggregation depth, the receiving terminal may reply a first response message to the sending terminal, wherein the first response message is sent with respect to the data messages of a number equivalent to the maximum aggregation depth, so that the first response message may carry number information for representing a total number of the received data messages, and the number information is consistent with the maximum aggregation depth. If the tolerance time limit runs out, and a total number of the data messages received does not reach the maximum aggregation depth, the receiving terminal may reply a second response message to the sending terminal, but the number of data messages responded by the second response message is less than the maximum aggregation depth. At the moment, the second response message may carry the number information for representing a total number of the received data messages. For example, the number of the data messages received by the receiving terminal within 1 ms is 3, while the current maximum aggregation depth is 6, and the determined tolerance time limit is 1 ms, then the receiving terminal may continuously count the number of the data messages received within the next 1 ms. If the receiving terminal receives another 3 data messages within next 1 ms, the total number of the received data messages reaches the current maximum aggregation depth, so that one response message may be fed back to the sending terminal, and the response message may carry the number information representing 6 data messages. However, if the receiving terminal receives 2 data messages only within next 1 ms, a total number of the received data messages is still less than the current maximum aggregation depth; as the tolerance time limit runs out, the receiving terminal may also feed back one response message to the sending terminal, and the number information carried in the response message may only represents 5 data messages.

It shall be noted that, in an actual application scenario, the number of the data messages received within a specified time slot is not necessarily an integer multiple of the maximum aggregation depth. For example, if the maximum aggregation depth is 6, while 15 data messages are received within 1 ms in total, then 2 response messages may be fed back in total with respect to the first 12 data messages; while for the remaining 3 data messages, since the number of remaining data messages is less than the maximum aggregation depth, the step of determining the tolerance time limit may also be triggered at the moment, so that the number of the data messages received may be continuously counted on the basis of the 3 data messages within next 1 ms. Subsequently, the response messages may be fed back based on whether the tolerance time limit is run out as well as the number of data messages counted within the tolerance time limit according to the contents set forth in the embodiment above, which will not be elaborated herein.

In this way, when receiving the response messages fed back by the receiving terminal, the sending terminal may determine the current window value, the current maximum aggregation depth and the current maximum bandwidth again, and send data messages according to the results determined again.

As can be seen above, in the technical solutions provided by the present application, when sending the data messages, the sending terminal may provide the receiving terminal with the maximum aggregation depth as well, and the maximum aggregation depth may be used as a basis for the receiving terminal to feed back the response messages. Specifically, the receiving terminal may reply one response message to the sending terminal whenever the number of the data messages received by the receiving terminal reaches the maximum aggregation depth. When receiving the response messages, the sending terminal may dynamically adjust the current maximum bandwidth and the current window value based on the number information carried in the response messages. The current maximum aggregation depth may be further adjusted according to the adjusted maximum bandwidth. Then, the data messages may be sent to the receiving terminal again according to the adjusted window value and the maximum aggregation depth, and the adjusted maximum aggregation depth may be provided to the receiving terminal as well. In this way, the receiving terminal may accordingly feed back the response messages according to the current maximum aggregation depth. Thus, in the present application, the receiving terminal may uniformly reply one response message when the data messages received reach the maximum aggregation depth. In this way, the receiving terminal does not need to feed back the response message for each data message, which greatly reduces the number of response messages to be sent. Thus, the sending terminal may reduce the time for processing the response messages; in addition, since the number of response messages is reduced, the probability of losing the response messages due to network fluctuation may also be reduced; and the sending terminal may adjust the window value in time, thus improving the data transmission efficiency.

In addition, in the current 802.11n protocols and subsequent protocols, when sending data messages in a MAC layer, data messages that reach the MAC layer within a short duration will generally be aggregated and then send out. By adopting the technical solutions of the present application, it may be guaranteed that the data messages of a number equivalent to the maximum aggregation depth continuously reach the MAC layer, thus facilitating aggregating more data messages and then sending out the aggregated data messages, so that the data transmission efficiency is improved.

Second Embodiment

Figure 3:
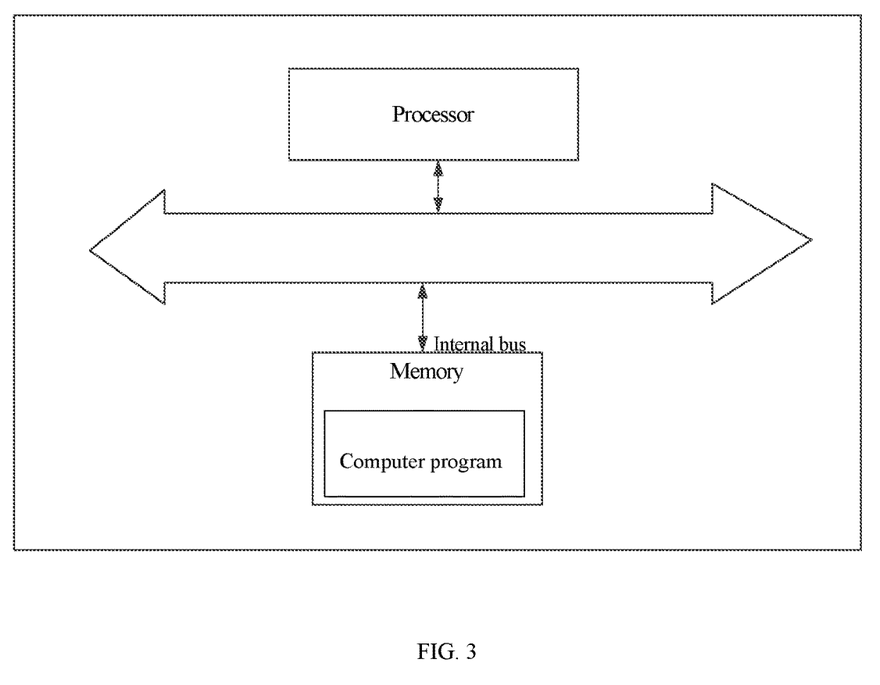
FIG. 3 is a structure diagram showing a sending terminal in a second embodiment of the present application.

With reference to FIG. 1 and FIG. 3, the present application further provides a sending terminal, wherein the sending terminal comprises a processor and a memory for storing a computer program therein, while being executed by the processor, the computer program implements the following steps.

In S11, data messages are sent to a receiving terminal based on an initial window value and an initial aggregation depth.

In S13, response messages fed back by the receiving terminal are received, and a current maximum bandwidth and a current window value are determined based on representation information of the response messages.

In S15, a current maximum aggregation depth is calculated according to the current maximum bandwidth.

In S17, data messages are sent to the receiving terminal according to the current window value and the current maximum aggregation depth, and the current maximum aggregation depth is provided to the receiving terminal, so that the receiving terminal feeds back the response messages according to the current maximum aggregation depth.

Third Embodiment

Figure 4:
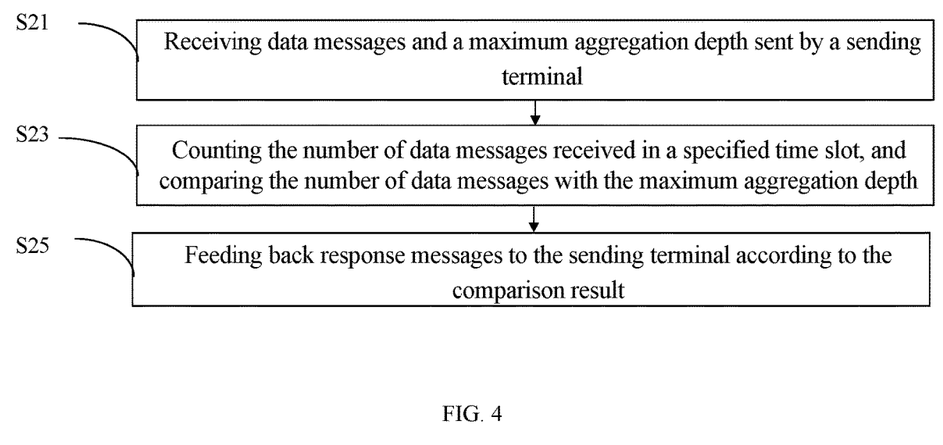
FIG. 4 is a flow chart showing a method for transmitting wireless network data in a third embodiment of the present application.
Figure 5:
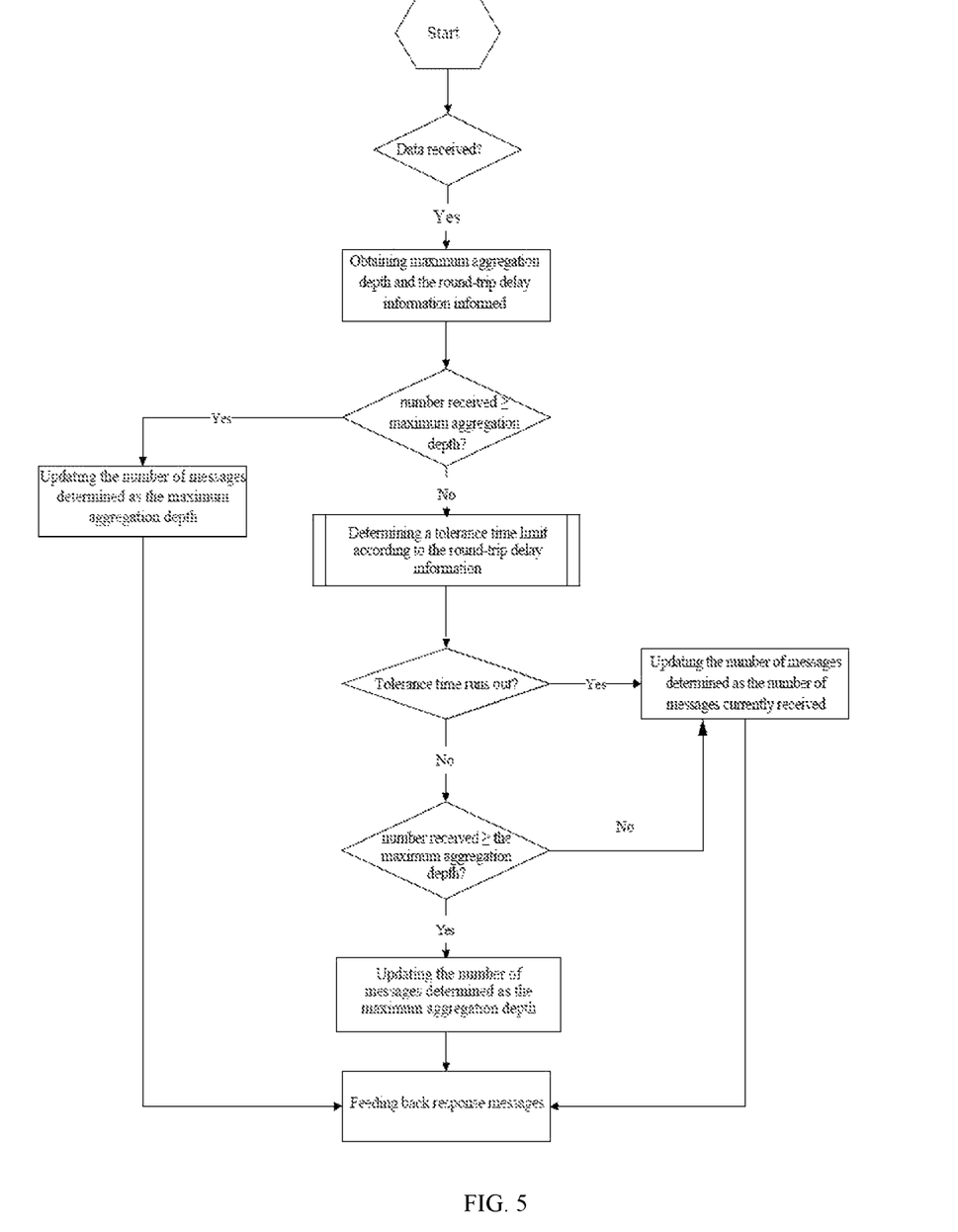
FIG. 5 is a schematic diagram showing the method for transmitting wireless network data in the third embodiment of the present application.

The present application further provides a method for transmitting wireless network data. The method may be applied to a receiving terminal, and the receiving terminal may be a terminal device used by a user. For example, the receiving terminal may be a desktop computer, a laptop, a tablet computer, a smart phone, or a smart wearable device supporting the wireless network. With reference to FIG. 4 and FIG. 5, the method includes the following steps.

In S21, data messages and a maximum aggregation depth sent by a sending terminal are received.

In the embodiment, the sending terminal may send the data messages to the receiving terminal according to a specified time period. For example, the specified time period may be 1 ms, so that the sending terminal may send the data messages to the receiving terminal every 1 ms. In each time period, the number of data messages sent by the sending terminal may be the same as the maximum aggregation depth. For example, if the maximum aggregation depth is 6, the sending terminal may send 6 data messages to the receiving terminal every 1 ms.

In the embodiment, when sending the data messages, the sending terminal may send the maximum aggregation depth to the receiving terminal as well. In this way, the receiving terminal may receive the data messages and the maximum aggregation depth sent by the sending terminal.

In S23, the number of the data messages received in a specified time slot is counted, and the number of data messages is compared with the maximum aggregation depth.

In S25, response messages are fed back to the sending terminal according to the comparison result.

In the embodiment, after receiving the maximum aggregation depth, the receiving terminal may feed back the response messages according to the maximum aggregation depth. Specifically, the receiving terminal may count the number of the data messages received within a specified time slot. The specified time slot may be the same as the time period when the sending terminal sends the data messages. For example, the sending terminal sends the data messages according to the time period of 1 ms, then the receiving terminal may count the number of the data messages received within the duration of 1 ms.

In the embodiment, when counting the number of the received data messages, the counted number may be compared with the maximum aggregation depth. When the number of data messages is greater than or equal to the maximum aggregation depth, the receiving terminal may reply one response message to the sending terminal each time the number of the received data messages reaches the maximum aggregation depth. For example, 18 data messages are received within 1 ms in total, and the current maximum aggregation depth is 6, the receiving terminal may reply 3 response messages, wherein each response message may be sent with respect to 6 data messages. In this way, the response messages may carry the number information for representing a total number of the received data messages, thus informing the sending terminal that the current response message is sent with respect to 6 data messages.

In addition, in the embodiment, if the number of data messages is less than the maximum aggregation depth, the receiving terminal may determine a tolerance time limit. The receiving terminal may continuously count the number of the data messages received within the tolerance time limit. For example, the number of the data messages received by the receiving terminal within 1 ms is 4, which is less than the current maximum aggregation depth of 6, then the receiving terminal may determine the tolerance time limit according to the current network status. Assuming that the tolerance time limit is 1 ms, the receiving terminal may continuously count the number of the data messages received within the next 1 ms based on the number of 4. For example, in the next 1 ms, the receiving terminal receives another 2 data messages, then the counted number of the received data messages is 6. In actual application, when sending the data messages to the receiving terminal, the sending terminal may provide round-trip delay information to the receiving terminal. The round-trip delay information may be determined by the sending terminal based on a time point at which a data messages is sent and a time point at which a data message is received. Specifically, a difference between time point when a data message is received and a time point at which a data message is sent may be used as the round-trip delay information. For example, the time n point at which a data messages is sent is 0 ms, while the time point at which a data messages is received is 10 ms, then the round-trip delay information may be 10 ms. In the embodiment, after receiving the round-trip delay information, the receiving terminal may determine the tolerance time limit according to the round-trip delay information, and feed back the response messages based on the tolerance time limit and the current maximum aggregation depth. Specifically, the receiving terminal may compare a delay represented by the round-trip delay information with a first delay threshold value and a second delay threshold value respectively when determining the tolerance time limit, wherein the first delay threshold value is less than the second delay threshold value. When the delay is less than or equal to the first delay threshold value, the tolerance time limit may be set as a first preset time limit value. When the delay is greater than the first delay threshold value, and is less than or equal to the second delay threshold value, the tolerance time limit may be set as a second preset time limit value. When the delay is greater than the second delay threshold value, the tolerance time limit may be set as a third preset time limit value, wherein the first preset time limit value is less than the second preset time limit value, and the second preset time limit value is less than the third preset time limit value. For example, when the delay is less than or equal to 20 ms, the tolerance time limit may be set as 1 ms; when the delay is greater than 20 ms, and less than or equal to 50 ms, the tolerance time limit may be set as 2 ms; and when the delay is greater than 50 ms, the tolerance time limit may be set as 5 ms.

In the embodiment, when the number of data messages is continuously counted within the tolerance time limit, if the tolerance time limit does not run out and a total number of the received data messages reaches the maximum aggregation depth, the receiving terminal may reply a first response message to the sending terminal, wherein the first response message is sent with respect to the data messages of the number equivalent to the maximum aggregation depth, so that the first response message may carry number information for representing the total number of the received data messages, and the number information is consistent with the maximum aggregation depth. If the tolerance time limit runs out, and the total number of the received data messages does not reach the maximum aggregation depth, the receiving terminal may reply a second response message to the sending terminal, but the number of data messages responded by the second response message is less than the maximum aggregation depth. At the moment, the second response message may carry the number information for representing the total number of the received data messages. For example, the number of the data messages received by the receiving terminal within 1 ms is 3, while the current maximum aggregation depth is 6, and the determined tolerance time limit is 1 ms, then the receiving terminal may continuously count the number of the data messages received within the next 1 ms. If the receiving terminal receives another 3 data messages within next 1 ms, the total number of the received data messages reaches the current maximum aggregation depth, so that one response message may be fed back to the sending terminal, and the response message may carry the number information representing 6 data messages. However, if the receiving terminal receives 2 data messages only within next 1 ms, a total number of the received data messages is still less than the current maximum aggregation depth; as the tolerance time limit runs out, the receiving terminal may also feed back one response message to the sending terminal, and the number information carried in the response message may only represents 5 data messages.

Fourth Embodiment

Figure 6:
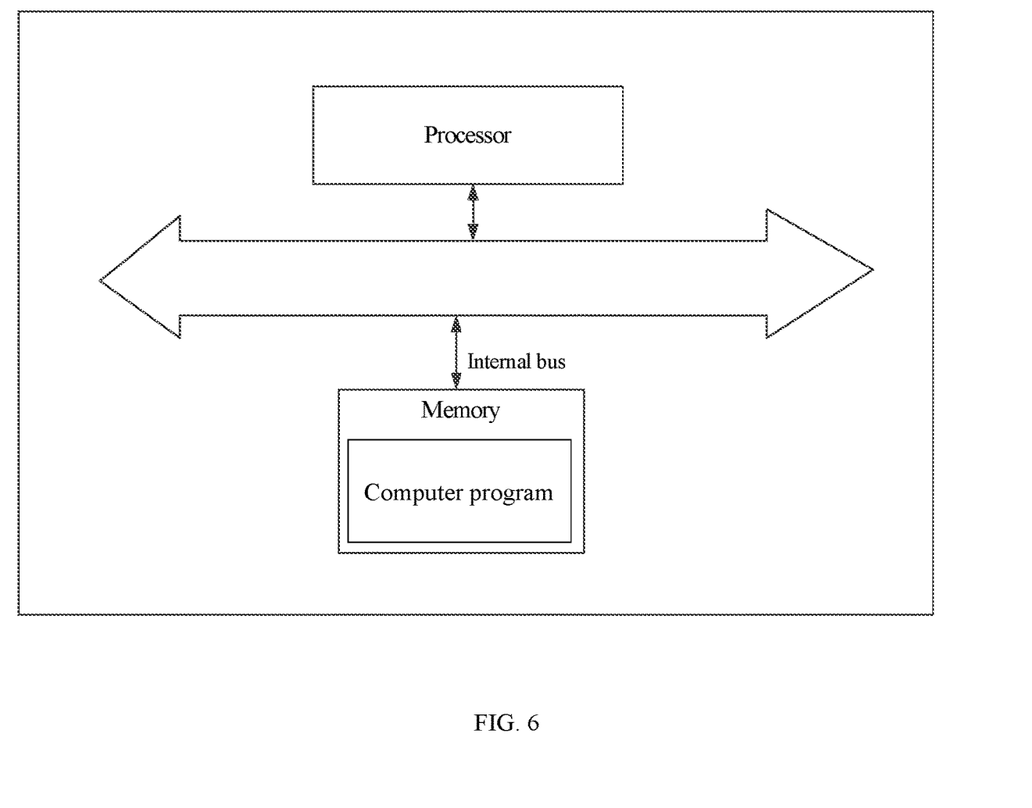
FIG. 6 is a structure diagram showing a receiving terminal in a fourth embodiment of the present application.

With reference to FIG. 4 and FIG. 6, the present application further provides a receiving terminal, wherein the receiving terminal comprises a processor and a memory for storing a computer program therein, while being executed by the processor, the computer program implements the following steps.

In S21, data messages and a maximum aggregation depth sent by a sending terminal are received.

In S23, the number of data messages received in a specified time slot is counted, and the number of data messages is compared with the maximum aggregation depth.

In S25, response messages are fed back to the sending terminal according to a comparison result.

The above serial numbers of the embodiments of the present application are used for description only, which do not represent the advantages and disadvantages of the embodiments. The various embodiments in this specification are described in a progressive manner, and the same and similar parts among the various embodiments may be referred to each other. Each embodiment focuses on the differences from other embodiments. In particular, the embodiments for both the sending terminal and the receiving terminal may be explained with reference to the descriptions in the embodiments of the foregoing methods.

Through the description of the above embodiments, those skilled in the art may clearly understand that the embodiments could be implemented by means of a software plus necessary general hardware platform, and certainly, the embodiments could also be implemented by means of hardware. Based on such understanding, the essence of the foregoing technical solutions, or the part contributing to the prior art, may be embodied in the form of a software product which is stored in a computer readable storage medium (such as a ROM/RAM, a magnetic disk, a magnetic disk) including a quantity of instructions such that a computer device (which may be a personal computer, a server, or a network device, etc.) performs the methods described in each of the embodiments or some parts of the embodiments.

Those described above are merely preferred embodiments of the present application, but are not intended to limit the present application. Any modifications, equivalent substitutions and improvements made without departing from the principle and spirit of the present application shall all fall in the scope of protection of the present application

What is claimed is:

1. A method for transferring wireless network data, applied to a sending terminal, comprising:
sending a first set of data messages to a receiving terminal based on an initial window value and an initial aggregation depth, wherein the initial aggregation depth defines an initial number of data messages sent each time, and the initial window value defines an initial total number of data messages continuously sent;
receiving response messages fed back by the receiving terminal, and determining a current maximum bandwidth and a current window value based on number information carried in the response messages, wherein the current window value defines a current total number of data messages continuously sent, and the number information is configured for representing a number of data messages received by the receiving terminal in a specified time slot;
calculating a current maximum aggregation depth according to the current maximum bandwidth, wherein the current maximum aggregation depth defines a current number of data messages sent each time; and
sending a second set of data messages to the receiving terminal according to the current window value and the current maximum aggregation depth, and providing the current maximum aggregation depth to the receiving terminal, so that the receiving terminal feeds back the response messages according to the current maximum aggregation depth.

2. The method according to claim 1, wherein the sending of the first set of data messages to the receiving terminal is based on the initial window value and the initial aggregation depth further comprises:
sending data messages in the first set of data messages to the receiving terminal according to a specified time period, wherein a number of data messages sent in each time period is the same as the initial aggregation depth, and stopping sending the data messages to be transmitted to the receiving terminal in response to determining that a total number of data messages continuously sent reaches the initial window value and the receiving terminal does not feed back the response messages; and
sending data messages to be transmitted of a number responded by the receiving terminal to the receiving terminal again, after receiving the response messages fed back by the receiving terminal.

3. The method according to claim 1, wherein the determining the current maximum bandwidth based on number information carried in the response messages further comprises:
recording respective response messages received within a preset period, and counting numbers represented by the number information in respective response messages; and
taking a ratio of a sum of the counted numbers to the preset period as the current maximum bandwidth.

4. The method according to claim 1, wherein the determining a current window value based on the response messages further comprises recording a number represented by the number information in the response message, and taking a sum of the initial window value and the recorded number as the current window value.

5. The method according to claim 4, further comprising maintaining the current window value unchanged in response to determining that the current maximum bandwidth is not increased within a specified duration.

6. The method according to claim 1, wherein the current maximum aggregation depth is calculated according to the following formula:

$$agg=1.2\cdot(pps+500)/1000$$

wherein, agg represents the current maximum aggregation depth, and pps represents the current maximum bandwidth.

7. The method according to claim 1, wherein the calculating a current maximum aggregation depth further comprises:
setting the current maximum aggregation depth no less than a first lower limit value in response to determining that the current maximum bandwidth is less than a specified threshold value; and
setting the current maximum aggregation depth no less than a second lower limit value in response to determining that the current maximum bandwidth is greater than or equal to the specified threshold value wherein the first lower limit value is less than the second lower limit value.

8. The method according to claim 2, wherein the calculating a current maximum aggregation depth further comprises:
setting the current maximum aggregation depth no less than a first lower limit value in response to determining that the current maximum bandwidth is less than a specified threshold value; and
setting the current maximum aggregation depth no less than a second lower limit value in response to determining that the current maximum bandwidth is greater than or equal to the specified threshold value, wherein the first lower limit value is less than the second lower limit value.

9. The method according to claim 1, wherein the calculating a current maximum aggregation depth further comprises:
setting the current maximum aggregation depth no less than a first lower limit value in response to determining that the current maximum bandwidth is less than a specified threshold value; and
setting the current maximum aggregation depth no less than a second lower limit value in response to determining that the current maximum bandwidth is greater than or equal to the specified threshold value, wherein the first lower limit value is less than the second lower limit value.

10. The method according to claim 3, wherein the calculating a current maximum aggregation depth further comprises:
setting the current maximum aggregation depth no less than a first lower limit value in response to determining that the current maximum bandwidth is less than a specified threshold value; and setting the current maximum aggregation depth no less than a second lower limit value in response to determining that the current maximum bandwidth is greater than or equal to the specified threshold value, wherein the first lower limit value is less than the second lower limit value.

11. The method according to claim 4, wherein the calculating a current maximum aggregation depth further comprises:
setting the current maximum aggregation depth no less than a first lower limit value in response to determining that the current maximum bandwidth is less than a specified threshold value; and
setting the current maximum aggregation depth no less than a second lower limit value in response to determining that the current maximum bandwidth is greater than or equal to the specified threshold value, wherein the first lower limit value is less than the second lower limit value.

12. The method according to claim 5, wherein the calculating a current maximum aggregation depth further comprises:
setting the current maximum aggregation depth no less than a first lower limit value in response to determining that the current maximum bandwidth is less than a specified threshold value; and
setting the current maximum aggregation depth no less than a second lower limit value in response to determining that the current maximum bandwidth is greater than or equal to the specified threshold value wherein the first lower limit value is less than the second lower limit value.

13. The method according to claim 6, wherein the calculating a current maximum aggregation depth further comprises:
setting the current maximum aggregation depth no less than a first lower limit value in response to determining that the current maximum bandwidth is less than a specified threshold value; and
setting the current maximum aggregation depth no less than a second lower limit value in response to determining that the current maximum bandwidth is greater than or equal to the specified threshold value wherein the first lower limit value is less than the second lower limit value.

14. The method according to claim 1, wherein, when providing the current maximum aggregation depth to the receiving terminal, the method further comprises providing round-trip delay information to the receiving terminal, so that the receiving terminal determines a tolerance time limit according to the round-trip delay information, and the receiving terminal feeds back the response messages based on the tolerance time limit and the current maximum aggregation depth.

15. A sending terminal, comprising a processor and a memory storing a computer program therein, while being executed by the processor, the computer program implements the following steps:
sending a first set of data messages to a receiving terminal based on an initial window value and an initial aggregation depth, wherein the initial aggregation depth defines an initial number of data messages sent each time, and the initial window value defines an initial total number of data messages continuously sent;
receiving response messages fed back by the receiving terminal, and determining a current maximum bandwidth and a current window value based on number information carried in the response messages, wherein the current window value defines a current total number of data messages continuously sent, and the number information is configured for representing a number of data messages received by the receiving terminal in a specified time slot;
calculating a current maximum aggregation depth according to the current maximum bandwidth, wherein the current maximum aggregation depth defines a current number of data messages sent each time; and
sending a second set of data messages to the receiving terminal according to the current window value and the current maximum aggregation depth, and providing the current maximum aggregation depth to the receiving terminal, so that the receiving terminal feeds back the response messages according to the current maximum aggregation depth.

16. A method for transferring wireless network data, applied to a receiving terminal, comprising:
receiving data messages and a maximum aggregation depth sent by a sending terminal, wherein the maximum aggregation depth defines a maximum number of data messages sent each time;
counting a number of data messages received in a specified time slot, and comparing the number of data messages with the maximum aggregation depth; and
feeding back response messages to the sending terminal according to a comparison result.

17. The method according to claim 16, wherein the feeding back response messages to the sending terminal according to the comparison result further comprises in response to determining that the number of data messages is greater than or equal to the maximum aggregation depth, feeding back one response message to the sending terminal each time the number of the received data messages reaches the maximum aggregation depth, wherein the response message carries number information for representing a total number of the received data messages.

18. The method according to claim 16, wherein the feeding back response messages to the sending terminal according to the comparison result further comprises:
in response to determining that the number of data messages is less than the maximum aggregation depth, determining a tolerance time limit and continuously counting the number of data messages received within the tolerance time limit;
in response to determining that the tolerance time limit does not run out and a total number of the received data messages reaches the maximum aggregation depth, replying a first response message to the sending terminal, wherein the first response message carries number information for representing the number of the received data messages; and
in response to determining that the tolerance time limit runs out and the total number of the received data messages does not reach the maximum aggregation depth, replying a second response message to the sending terminal, wherein the second response message carries number information for representing the total number of the received data messages.

19. The method according to claim 18, further comprising: when receiving the data messages and the maximum aggregation depth sent by the sending terminal:
receiving round-trip delay information sent by the sending terminal;
accordingly, the determining the tolerance time limit comprises:

comparing a delay represented by the round-trip delay information with a first delay threshold value and a second delay threshold value respectively, wherein the first delay threshold value is less than the second delay threshold value;

setting the tolerance time limit as a first preset time limit value in response to determining that the delay is less than or equal to the first delay threshold value;

setting the tolerance time limit as a second preset time limit value in response to determining that the delay is greater than the first delay threshold value but less than or equal to the second delay threshold value; and setting the tolerance time limit as a third preset time limit value in response to determining that the delay is greater than the second delay threshold value, wherein the first preset time limit value is less than the second preset time limit value, and the second preset time limit value is less than the third preset time limit value.

* * * * *